United States Patent
Min et al.

(10) Patent No.: US 9,635,277 B2
(45) Date of Patent: Apr. 25, 2017

(54) IMAGE SENSOR, IMAGE SENSING METHOD, AND IMAGE PHOTOGRAPHING APPARATUS INCLUDING IMAGE SENSOR

(71) Applicant: SAMSUNG ELECTRONICS CO., LTD., Suwon-si, Gyeonggi-do (KR)

(72) Inventors: Dong-Ki Min, Seoul (KR); Ilia Ovsiannikov, Studio City, CA (US); Lilong Shi, Pasadena, CA (US); Tae-Chan Kim, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/790,359

(22) Filed: Jul. 2, 2015

(65) Prior Publication Data
US 2016/0065822 A1 Mar. 3, 2016

(30) Foreign Application Priority Data
Jul. 4, 2014 (KR) .......... 10-2014-0083901

(51) Int. Cl.
*H04N 5/238* (2006.01)
*H04N 5/235* (2006.01)

(52) U.S. Cl.
CPC ......... *H04N 5/2353* (2013.01); *H04N 5/2354* (2013.01)

(58) Field of Classification Search
CPC .... H04N 5/2357; H04N 5/2353; H04N 5/351; H04N 5/353; H04N 5/235
USPC ........... 348/226.1–228.1, 294, 296, 362–367
See application file for complete search history.

(56) References Cited

U.S. PATENT DOCUMENTS

| | | | |
|---|---|---|---|
| 8,063,866 B2 | 11/2011 | Hayashi et al. | |
| 8,149,308 B2 | 4/2012 | Masuyama et al. | |
| 9,071,749 B2 | 6/2015 | Hwang et al. | |
| 2006/0140604 A1* | 6/2006 | Suda | H04N 5/23248 396/55 |
| 2007/0024741 A1 | 2/2007 | Moriya et al. | |
| 2009/0160976 A1* | 6/2009 | Chen | H04N 5/2354 348/234 |

(Continued)

FOREIGN PATENT DOCUMENTS

| | | |
|---|---|---|
| JP | 2002238000 | 8/2002 |
| JP | 2003087630 A | 3/2003 |

(Continued)

OTHER PUBLICATIONS

Korean Office Action Dated April 8, 2016 Corresponding to Korean Application No. 14-83901.

*Primary Examiner* — Kelly L Jerabek
(74) *Attorney, Agent, or Firm* — Volentine & Whitt, PLLC

(57) ABSTRACT

An image sensor operates in a base mode according to a first sampling rate and a first pixel exposure time and includes a light condition detector that extracts illuminance information from a pixel signal received from pixels in a pixel array, and generates a low-illuminance information signal upon detecting that a value of the illuminance information falls within a first range, a sampling controller that changes the first sampling rate to a second sampling rate in response to the low-illuminance information signal, and an exposure time controller that changes the first pixel exposure time to a second pixel exposure time in response to the low-illuminance information signal.

20 Claims, 10 Drawing Sheets

(56) References Cited

U.S. PATENT DOCUMENTS

| | | |
|---|---|---|
| 2009/0219427 A1 | 9/2009 | Kim et al. |
| 2010/0231748 A1* | 9/2010 | Takeda .................... G03B 5/00 348/229.1 |
| 2012/0241594 A1 | 9/2012 | Noiret et al. |
| 2012/0320246 A1 | 12/2012 | Ikuma et al. |
| 2014/0192202 A1* | 7/2014 | Sano ...................... H04N 5/332 348/164 |
| 2014/0293102 A1 | 10/2014 | Vogelsang et al. |
| 2014/0293103 A1 | 10/2014 | Wakabayashi et al. |
| 2014/0313387 A1 | 10/2014 | Vogelsang et al. |
| 2014/0320695 A1 | 10/2014 | Ozawa et al. |
| 2015/0138392 A1* | 5/2015 | Sugawara ............ H04N 5/2351 348/226.1 |
| 2015/0146060 A1* | 5/2015 | Suzuki ................ H04N 5/37452 348/300 |
| 2015/0312464 A1* | 10/2015 | Peng .................... H04N 5/2357 348/226.1 |

FOREIGN PATENT DOCUMENTS

| | | |
|---|---|---|
| JP | 2007133159 | 5/2007 |
| JP | 2013090234 | 5/2013 |
| JP | 2014053838 A | 3/2014 |
| KR | 20120140571 A | 12/2012 |
| WO | WO13070942 A1 | 5/2013 |
| WO | WO2013089036 A1 | 6/2013 |

\* cited by examiner

IMAGE SENSOR, IMAGE SENSING METHOD, AND IMAGE PHOTOGRAPHING APPARATUS INCLUDING IMAGE SENSOR

CROSS-REFERENCE TO RELATED APPLICATION

This application claims the benefit of Korean Patent Application No. 10-2014-0083901 filed on Jul. 4, 2014, the subject matter of which is hereby incorporated by reference.

BACKGROUND

The inventive concept relates generally to image sensors, image sensing methods, and image photographing apparatuses including image sensor(s). More particularly, the inventive concept relates to image sensors capable of operating with improved signal-to-noise (SNR) ratios under low-illuminance conditions, as well as image sensing methods and image photographing apparatuses including such image sensor(s).

Technology related to imaging devices and image photographing methods is rapidly developing. As pixel size has been reduced, certain binary sensor techniques or multi-bit, over-sampling sensor techniques have become increasingly important in various image acquisition techniques that ensure a full well capacity (FWC) range. Unfortunately, conventional approaches to multi-bit, over-sampling sensor techniques performed under low-illuminance conditions often results in an unacceptable signal-to-noise ratio (SNR).

SUMMARY

Embodiments of the inventive concept provide image sensors exhibiting an improved signal-to-noise ratio (SNR) under low-illuminance conditions by detecting an illuminance condition with respect to an object. Other embodiments of the inventive concept provide image sensing methods and image photographing apparatuses for such image sensors.

According to an aspect of the inventive concept, there is provided an image sensor operating based on a sampling frequency set to a first sampling frequency, a second sampling rate set to a first sampling rate, and a pixel exposure time set to a first pixel exposure time, the image sensor including: a pixel array including a plurality of pixels through which visible light reflected by an object is converted to a pixel signal; a light condition detector that extracts illuminance information from the pixel signal and generates a low-illuminance condition information signal if the illuminance information is within a first range; a sampling controller that modifies at least one of the first sampling frequency and the first sampling rate to a second sampling frequency or a second sampling rate in response to the low-illuminance condition information signal; and an exposure time controller that modifies the first pixel exposure time to a second pixel exposure time in response to the low-illuminance condition information signal.

The light condition detector may generate a high-illuminance condition information signal if the illuminance information is within a second range, and the sampling controller may modify at least one of the second sampling frequency and the second sampling rate to the first sampling frequency or the first sampling rate in response to the high-illuminance condition information signal, and the exposure time controller may modify the second exposure time to the first pixel exposure time in response to the high-illuminance condition information signal.

The image sensor may operate using a rolling shutter method in which a resetting operation and a reading operation are performed in units of rows of the pixel array.

The image sensor may further include a sampling module that performs sampling based on a control signal regarding at least one of the sampling frequency and the sampling rate received from the sampling controller, and the sampling controller may control the sampling module such that at least one of the first sampling frequency and the first sampling rate is modified to the second sampling frequency or the second sampling rate.

The second sampling frequency may be smaller than the first sampling frequency, and the second sampling rate may be smaller than the first sampling rate.

The image sensor may further include a shuttering unit that resets each of the pixels of the pixel array in units of pixel exposure times and reads the pixels in units of pixel exposure times to sense a pixel signal, and the shuttering unit may control a reset timing of the pixels to modify an exposure time of the pixels.

The exposure time controller may control the shuttering unit such that the shuttering unit adjusts the reset timing to modify the first pixel exposure time to the second pixel exposure time.

The second pixel exposure time may be longer than the first pixel exposure time.

Data about at least one of the second sampling frequency and the second sampling rate may be stored as first data by using the sampling controller, and the image sensor may further include a register unit that stores data about the second pixel exposure time as second data by using the exposure time controller.

The sampling controller may refer to the first data when modifying at least one of the first sampling frequency and the first sampling rate to the second sampling frequency or the second sampling rate in response to a low-illuminance condition information signal that is activated after the first and second data is stored in the register unit, and the exposure time controller may refer to the second data when modifying the first pixel exposure time to the second pixel exposure time.

According to another aspect of the inventive concept, there is provided an image photographing apparatus, including: a lens that receives visible light reflected by an object; an image sensor that senses image information about the object from the visible light transmitted from the lens; a processor that controls the image sensor and performs signal-processing on the image information transmitted from the image sensor, wherein the image sensor operates based on a sampling frequency set to a first sampling frequency, a sampling rate set to a first sampling rate, and a pixel exposure time set to a first pixel exposure time a pixel array that includes a plurality of pixels through which visible light reflected by the object is converted to a pixel signal; a light condition detector that extracts illuminance information from the pixel signal and generates a low-illuminance condition information signal if the illuminance information is within a first range; a sampling controller that modifies at least one of the first sampling frequency and the first sampling rate to a second sampling frequency or a second sampling rate in response to the low-illuminance condition information signal; and an exposure time controller that modifies the first pixel exposure time to a second pixel exposure time in response to the low-illuminance condition information signal.

The light condition detector may generate a high-illuminance condition information signal if the illumination information is within a second range, and the sampling controller may modify at least one of the second sampling frequency and the second sampling rate to the first sampling frequency or the first sampling rate in response to the high-illumination condition information signal, and the exposure time controller may modify the second pixel exposure time to the first pixel exposure time in response to the high-illumination condition information signal.

The image sensor may further include a sampling module that performs sampling based on a control signal regarding at least one of the sampling frequency and the sampling rate received from the sampling controller, and the sampling controller may control the sampling module to modify at least one of the first sampling frequency and the first sampling rate to the second sampling frequency or the second sampling rate.

The image sensor may further include a shuttering unit that resets each of the pixels of the pixel array in units of pixel exposure times and reads the pixels in units of pixel exposure times to sense a pixel signal, and the shuttering unit may control a reset timing of the pixel to modify an exposure time of the pixels.

The second sampling frequency may be smaller than the first sampling frequency, and the second sampling rate may be smaller than the first sampling rate, and the second pixel exposure time may be longer than the first pixel exposure time.

BRIEF DESCRIPTION OF THE DRAWINGS

Certain embodiments of the inventive concept will be described in some additional detail with reference to the accompanying drawings in which:

FIG. 3, including

DETAILED DESCRIPTION

Figure 1:
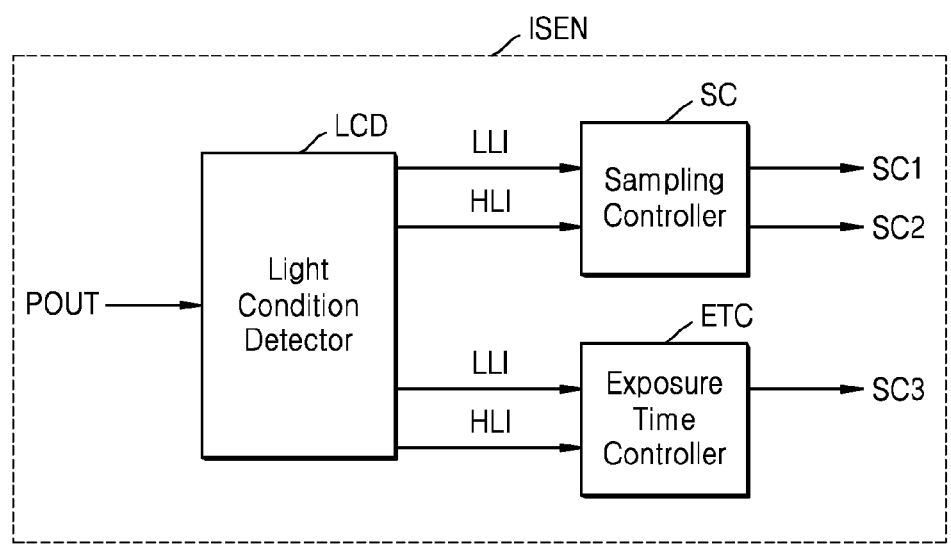
FIG. 1 is a block diagram illustrating an image sensor (ISEN) according to an embodiment of the inventive concept.

Certain embodiments of the inventive concept will be described in some additional detail with reference to the accompanying drawings. The illustrated embodiments are provided so that this disclosure will be thorough and complete to those of ordinary skill in the art. As the inventive concept allows for various changes and many different forms, particular embodiments will be illustrated in the drawings and described in detail in the written description. However, the scope of the inventive concept is not limited to only the particular modes of practice illustrated or described herein. Rather, the scope of the inventive concept encompasses many changes, equivalents, and substitutes for the illustrated examples. Throughout the written description and drawings, like reference numbers and labels denote like or similar elements.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined differently, all terms used in the description including technical and scientific terms have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

Expressions such as "at least one of," when preceding a list of elements, modify the entire list of elements and do not modify the individual elements of the list.

Figure (FIG. 1 is a block diagram illustrating an image sensor (ISEN) according to an embodiment of the inventive concept.

Referring to FIG. 1, the image sensor comprises a light condition detector (LCD), a sampling controller (SC), and an exposure time controller (ETC). The image sensor of FIG. 1 may be used to sense or derive "image information" with respect to an object. For example, the image sensor may be used to detect or generate a "time of flight" (TOF) for a signal generated by (or generated in response to) the image sensor.

In certain embodiments of the inventive concept, the image sensor operates by first executing (or performing) a "sampling operation" that senses a pixel signal. This may be done by reading pixel data at a "second sampling rate" defined with respect to a "basic operating mode" characterized by a "second sampling frequency". Here, the second sampling rate (e.g., a rate measured in 'frames per second' or FPS) and a corresponding "second pixel exposure time" are respectively set according to the second sampling frequency. In this example, the basic operating mode is assumed to be a default operating mode used when the image sensor is operated under relatively high (or "normal") illuminance conditions. Alternately, the sampling operation may be done by reading pixel data at a "first sampling rate" defined with respect to a "low light operating mode" characterized by a "first sampling frequency". Here, the first sampling rate and corresponding "first pixel exposure time" are respectively set according to the first sampling frequency. In this example, the low light operating mode is assumed to be an operating mode used when the image sensor is operated under relatively low illuminance conditions.

The light condition detector may be used to extract illuminance information LI from a pixel signal POUT received by the image sensor, where the pixel signal POUT is assumed to be a bit-unit signal that is converted to corresponding digital data by an analog-to-digital converter ADC (not shown in FIG. 1, but see e.g., FIG. 2) that may be included in the image sensor. That is, the light condition detector may be used to extract illuminance information LI provided to the sampling controller SC and exposure time controller under both high illuminance conditions (i.e., a high-illuminance information signal HLI) and low illuminance conditions (i.e., a low-illuminance information signal LLI).

In certain embodiments of the inventive concept, the high-illuminance information signal HLI and the low-illuminance information signal LLI may be respectively generated using a histogram analysis method. For example, if the illuminance information LI extracted from the pixel signal POUT is expressed by four (4) bits, then illuminance information LI falling into (e.g.,) a first illuminance range of 0000 to 0011 may be deemed to denote the low-illuminance condition, and illuminance information LI falling into (e.g.,) a second illuminance range of 0000 to 1111 may be deemed to denote the high-illuminance condition. As a result, a high-illuminance information signal HLI or a low-illuminance information signal LLI respectively corresponding to the high-illuminance condition or low-illuminance condition may be provided to the sampling controller and exposure time controller.

Upon receiving the low-illuminance condition information signal LLI, the sampling controller SC may provide a sampling module (not shown in FIG. 1, but see e.g., FIG. 2) with a first control signal CS1 that changes the first sampling frequency to the second sampling frequency corresponding to the low-illuminance condition. Also, the sampling controller SC may provide the sampling module with a second control signal CS2 that changes the second sampling frequency to the first sampling frequency corresponding to the high-illuminance condition. That is, the sampling module may switch between the first sampling frequency (and corresponding first sampling rate for the pixel signal POUT) and the second sampling frequency (and corresponding second sampling rate for the pixel signal POUT) in response to the first control signal CS1 and/or the second control signal CS2. In certain embodiments of the inventive concept, the second sampling frequency will be lower than the first sampling frequency, such that the lower sampling frequency is applied under the low-illuminance condition to increase the maximum range for the pixel exposure time.

In certain other embodiments of the inventive concept, the second sampling rate will be less than the first sampling rate. And since a first sample period (e.g., a frame period) is equal to 1/the first sampling rate, the sample period defined for low-illuminance conditions by embodiments of the inventive concept will be relatively greater than sample periods similarly defined by conventional approaches. Thus, the sampling controller SC may determine with a greater degree of accuracy in relation to the first sampling period the nature of the pixel signal POUT during low-illuminance conditions. Further, the second sampling frequency, second sampling rate, and second sample period may be determined in view of the first sampling frequency, second sampling rate, and second sample period associated with the low-illuminance condition (e.g., in relation to the low-illuminance information signal LLI). For example, the lower the level of illuminance as indicated by the low-illuminance information signal LLI, the lower the second sampling frequency may be set.

Thus, assuming that the sampling controller SC receives the high-illuminance information signal HLI and then provides the sampling module with the first control signal CS1, the sampling module will change (as necessary) the first sampling frequency to the second sampling frequency corresponding to the high-illuminance condition. Also, the sampling controller may provide a sampling module with a second control signal CS2 in order to change the second sampling rate to the first sampling rate corresponding to the high-illuminance condition. In response to the first control signal CS 1 or the second control signal CS2, the sampling module may change between the first and second sampling frequencies and respectively corresponding first and second sampling rates. The first sampling frequency and first sampling rate and/or the second sampling frequency and second sampling rate may be stored as control data in a register unit. Then, when a change in sampling frequency is indicated, the sampling controller may reference the register unit.

According to certain embodiments of the inventive concept, upon receiving a low-illuminance information signal LLI, the exposure time controller may provide a shuttering unit (not shown in FIG. 1, but see e.g., FIG. 2) with a third control signal CS3 in order to change a first pixel exposure time corresponding to low-illuminance conditions to a second pixel exposure time corresponding to high-illuminance conditions. Here, the shuttering unit may control "rest timing" for pixels (e.g., pixels arranged in row units of a pixel array), where the reset timing controls an interval during which the pixels are reset. By extending the reset timing, for example, the shuttering unit may change the first pixel exposure time to the second pixel exposure time longer than the first pixel exposure time. Given a relatively longer pixel exposure time under low-illuminance conditions, signal-to-noise ratio may be correspondingly improved. Thus, the exposure time controller may accurately operate according to low-illuminance conditions to generate or derive the second pixel exposure time in response to the low-illuminance information signal LLI. This approach will be described hereafter in some additional detail.

Upon receiving a high-illuminance information signal HLI, the exposure time controller ETC provides a shuttering unit with a third control signal CS3 that changes between the second pixel exposure time used under low-illuminance conditions and the first pixel exposure time used under high-illuminance conditions.

Hence, a sampling frequency, sampling rate, and corresponding pixel exposure time may all be defined in response to one or more control signals (e.g., first, second and/or third control signals—SC1, SC2 and/or SC3) generated by the sampling controller SC and exposure time controller in response to low-illuminance conditions or high-illuminance conditions.

With reference to the embodiment illustrated in FIG. 1, the light condition detector, sampling controller, and/or exposure time controller may be commonly integrated on a single module. In one alternate embodiment, the image sensor may further include a timing generator that receives at least one of the first, second, and third control signals CS1, CS2, and CS3 and controls the sampling frequency, sampling rate and pixel exposure time accordingly.

Figure 2:
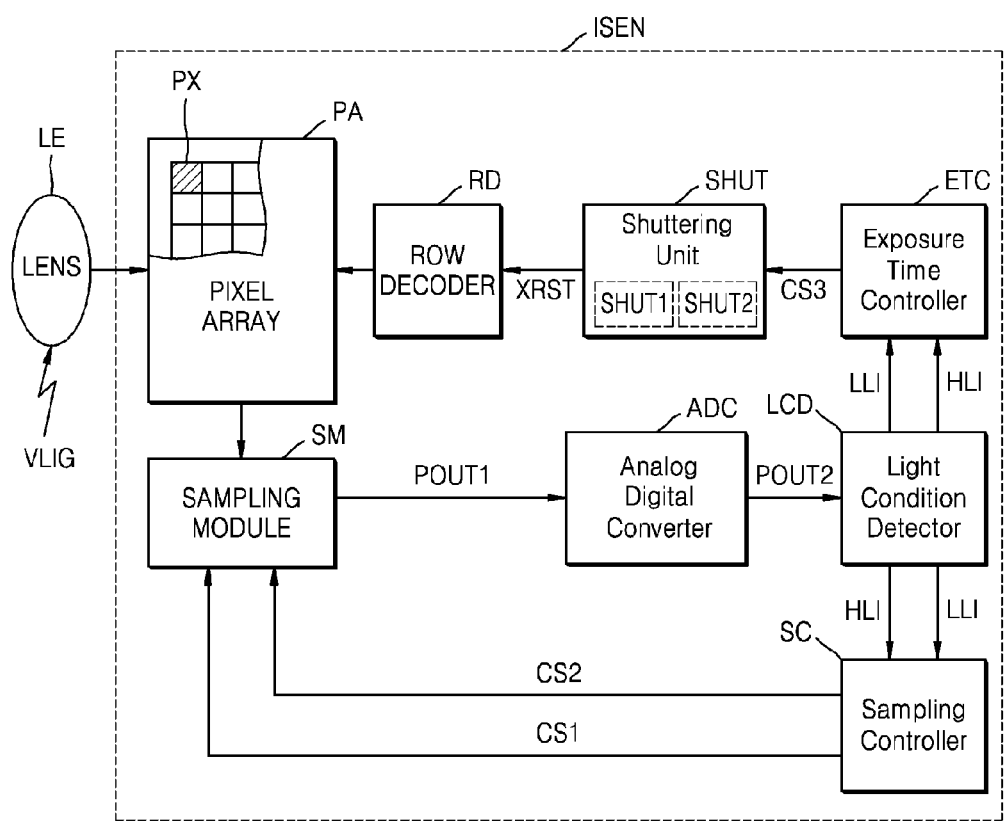
FIG. 2 is a block diagram further illustrating in one example the image sensor (ISEN) of FIG. 1 according to an embodiment of the inventive concept.

FIG. 2 is a block diagram further illustrating in one example the image sensor (ISEN) of FIG. 1 according to an embodiment of the inventive concept.

Referring to FIG. 2, the image sensor further comprises in addition to the light condition detector LCD, sampling controller SC, and exposure time controller ETC, a pixel array PA, a row decoder RD, a sampling module SM, an analog-to-digital converter ADC, and a shuttering unit SHUT. The pixel array PA includes pixels PX arranged in a matrix of rows and columns. The pixels PX may each include a photoelectric conversion device that generates an electric change corresponding to incident light, such as for example, visible light VLIG. The photoelectric conversion device may be, for example, a photodiode, a phototransistor, a photo-gate, or a pinned photodiode. The pixels PX may include a transmission transistor, a drive transistor, a selection transistor or a reset transistor that is connected to the photoelectric conversion device to control the photoelectric conversion device or outputs an electric change of the photoelectric conversion device as a first pixel signal POUT1. Each transistor included in the pixels PX may output a voltage (a first pixel signal POUT1) corresponding to visible light received by the photoelectric conversion device of each of the pixels PX.

The sampling module SM may be used as described above to sample the first pixel signal POUT1 that is output from the pixels PX, and communicate the first pixel signal POUT1 to the analog-to-digital converter ADC. The analog-to-digital converter ADC may convert the first pixel signal POUT1 having an analog voltage value to digital data. The analog-to-digital converter ADC may provide the light condition detector LCD with a second pixel signal POUT2 which is obtained by converting the first pixel signal POUT1 to digital data. Thus, the light condition detector LCD may receive the second pixel signal POUT2 which is in units of bits and is obtained by converting the first pixel signal POUT1) to digital data to extract illuminance information LI and may provide the sampling controller SC and the exposure time controller ETC with a low-illuminance condition information signal LLI and a high-illuminance condition information signal HLI based on the illuminance information LI. The first pixel signal POUT1 and the second pixel signal POUT2 may include a plurality of signals. Accordingly, the low-illuminance or high-illuminance information signals LLI or HLI may be generated by using the above-described histogram analysis method.

Operation of the sampling controller SC and exposure time controller ETC have been described above with respect to FIG. 1. The shuttering unit SHUT may operate in a rolling shutter manner, for example, such that the shuttering unit SHUT communicates a reset signal XRST to a row decoder RD. The row decoder RD may sequentially reset first through last rows (e.g., R1 through Rn) in units of rows with respect to the pixel array PA in response to the reset signal XRST.

The shuttering unit SHUT may receive the third control signal CS3 described above from the exposure time controller ETC, and in response to the third control signal CS3, it may control the reset timing of the reset signal XRST. Thus, the shuttering unit SHUT may include at least one resetting unit (e.g., a first resetting unit SHUT1 and a second resetting unit SHUT2 in the illustrated example, where the first resetting unit SHUT1 resets a first row in units of rows with respect to the pixel array PA, and the second resetting unit SHUT2 resets a (next) second row, then the first resetting unit SHUT1 resets a (next) third row next, etc. when communicating the reset signal XRST).

As noted above, the sampling controller SC and exposure time controller ETC may be used to determine an illuminance condition (e.g., "high" or "low") and even under low-illuminance conditions, as indicated by the low-illuminance information signal LLI, derive an optimum sampling frequency, sampling rate, and pixel exposure time. The light condition detector LCD may provide the sampling controller SC and exposure time controller ETC with either a low-illuminance information signals LLI or the high-illuminance information signals LLH in response to a detected illuminance condition. Then, the sampling controller SC and exposure time controller ETC may derive the optimum sampling frequency, sampling rate, and pixel exposure time.

FIG. 3 is a graph illustrating a method of determining illuminance conditions based on a low-illuminance information signal LLI according to an embodiment of the inventive concept.

Figure 3A:
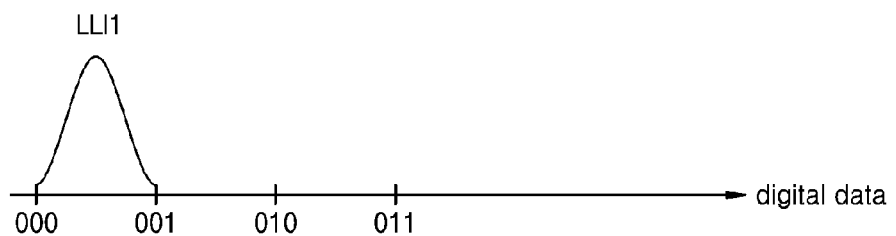
FIGS. 3A, 3B and 3C, is a graph illustrating one method of determining illuminance based on a low-illuminance condition information signal according to an embodiment of the inventive concept.
Figure 3B:
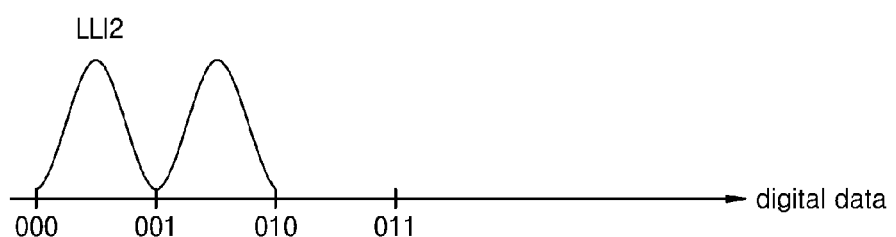
Figure 3C:
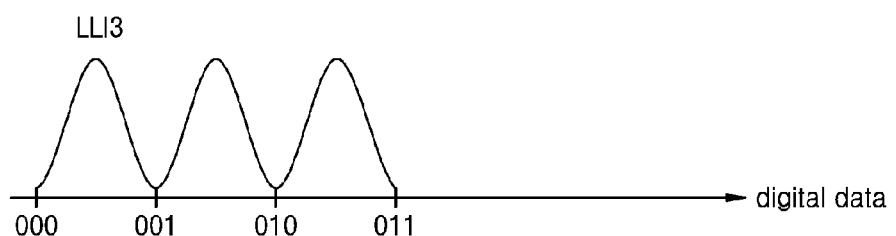

Referring to FIG. 3, the low-illuminance information signal LLI is assumed to be a digital data signal. An amount of illuminance may be determined based on a range of values for the digital data signal. That is, a first low-illuminance information signal LLI1 shown in FIG. 3A is assumed to be in a first range of 000 to 001, a second low-illuminance information signal LLI2 shown in FIG. 3B is assumed to be in a second range of 000 to 010 greater than the first range, and a third low-illuminance information signal LLI3 shown in FIG. 3C is assumed to be is a third range of 000 to 011, greater than the second range.

In this working example, the sampling controller SC and exposure time controller ETC of FIGS. 1 and 2 may be used to set a number of different first sampling frequencies, first sampling rates, and first pixel exposure times respectively appropriate to the different low-illuminance conditions. For example, when the first (lowest) low-illuminance condition information signal LLI1 is received, a longest first pixel exposure time may be set or selected. Or when the third (highest) low-illuminance condition information signal LLI3 is received, a shortest first pixel exposure time may be set or selected. In this manner, the signal-to-noise ratio may be improved a function of detected low-illuminance conditions.

This type of approach might also be used for different high-illuminance signals and corresponding conditions.

Figure 4:
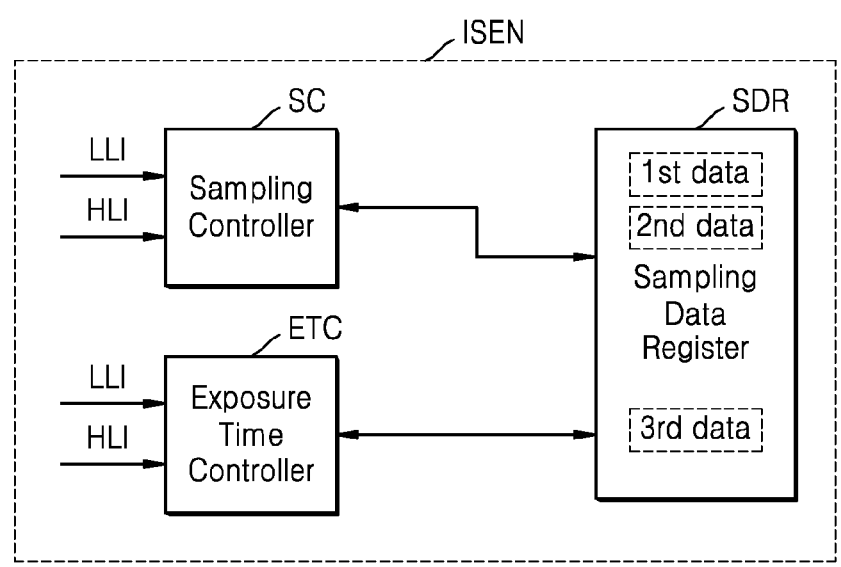
FIG. 4 is a block diagram illustrating an image sensor further including a register unit according to an embodiment of the inventive concept.

FIG. 4 is a block diagram illustrating an image sensor ISEN further including a register unit according to an embodiment of the inventive concept.

Referring to FIG. 4, the image sensor ISEN may further include a sampling data register SDR in addition to the image sensor ISEN of FIG. 1. The sampling data register SDR may store a first sampling frequency, first sampling rate, and a first pixel exposure time as third data. The sampling data register SDR may store, according to a low-illuminance condition, data about at least one of the set second sampling frequency and the set second sampling rate as first data $1^{st}$ data. Also, the sampling data register SDR may store, according to a low-illuminance condition, data about the set second pixel exposure time as second data $2^{nd}$ data. If the illuminance conditions change from high-illuminance to low-illuminance, the first sampling frequency, first sampling frequency, and the first pixel exposure time that were preset upon system initiation, for example, may be reset in response to one or more control signals. The first sampling frequency, first sampling rate, and first pixel exposure time may be pre-stored in the sampling data register SDR as third data $3^{rd}$ data. Later, when high-illuminance conditions are detected, the first sampling frequency, first sampling rate, and first pixel exposure time may be reset using the first data $1^{st}$ data stored in the sampling data register SDR. Also, data about at least one of the second sampling frequency and second sampling rate that may be set under low-illuminance conditions may be stored as first data $1^{st}$ data, and the data about a second pixel exposure time may be stored as second data $2^{nd}$ data. Next, if the same or similar low-illuminance condition is detected and thus an activated low-illuminance condition information signal is received, the first sampling frequency, the first FPS, and the first pixel exposure time may be respectively changed to the second sampling frequency, the second FPS, and the second pixel exposure time by referring to the first and second data $1^{st}$ data and $2^{nd}$ data stored in the sampling data register SDR. However, this is an exemplary embodiment, and the embodiments of the inventive concept are not limited thereto; each sampling frequency, pixel exposure time, and sampling rate information described above may be stored as a single piece of data. In addition, in response to the first low-illuminance condition information signal LLI1, the second low-illuminance condition information signal LL2, and the third low-illuminance condition information signal LL3, data about the second sampling frequency, the second FPS, and the second pixel exposure time that are respectively differently calculated may be stored in the sampling data register SDR.

Figure 5A:
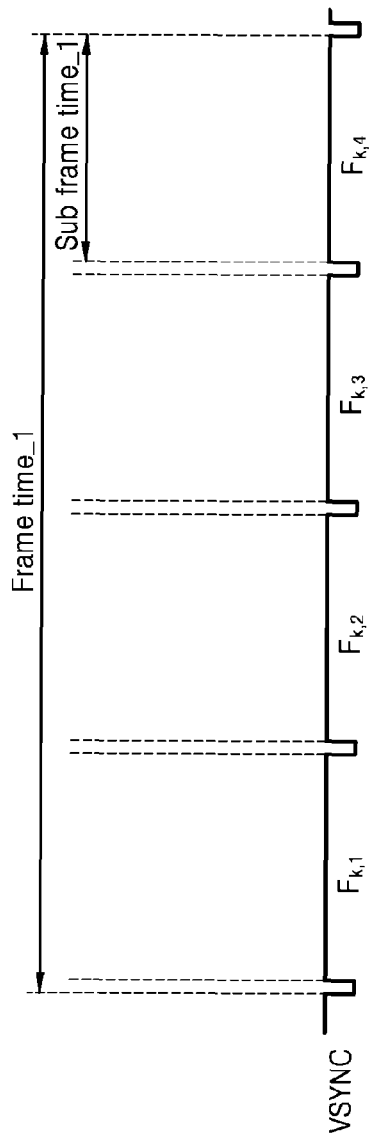
FIGS. 5A and 5B illustrate signal waveforms for a sampling operation when a sampling controller controls a sampling frequency.
Figure 5B:
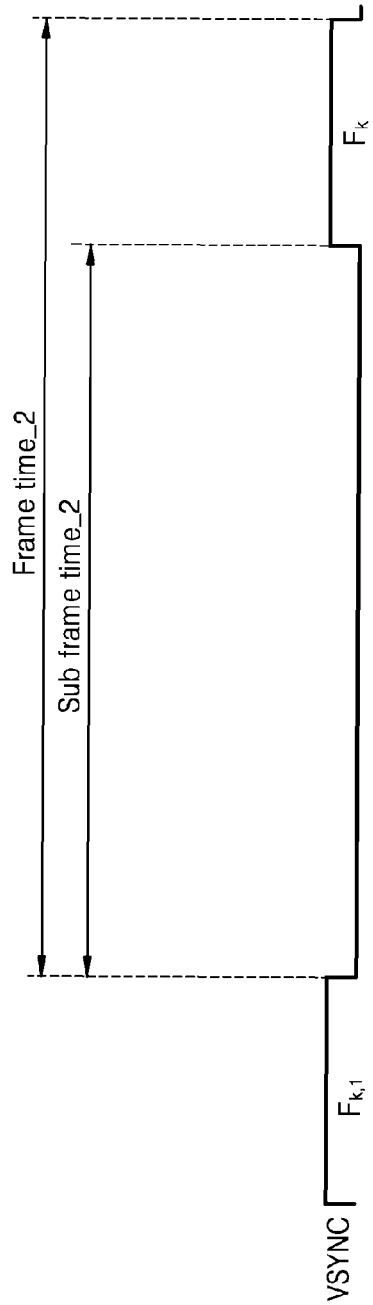

FIGS. 5A and 5B illustrate signal waveforms for a sampling operation when a sampling controller SC controls a sampling frequency.

FIG. 5A illustrates operation of the image sensor ISEN under a high-illuminance condition. First, the image sensor ISEN generates an image completed by combining a plurality of previously generated images using a multi-sampling method. Here, the time required to perform one sampling is referred to as a "sub-frame time", and time required to perform the whole multi-sampling is referred to as "frame time", where frame time corresponds to a sampling period defined by a sampling rate and frequency. With respect to the sampling period, when a sampling clock VSYNC is logically "high", the sampling module SM performs sampling, and stops sampling when a sampling clock VSYNC goes logically "low". In the illustrated example of FIG. 5A, sampling is done four (4) times under the high-illuminance condition. However, if sampling is performed multiple times, since a frame time is fixed, a number of sub-frame times is reduced according to the number of times sampling is performed. The sub-frame time represents a maximum pixel exposure time A during which a pixel is exposed, and as the maximum pixel exposure time A is reduced, light intensity under the low-illuminance condition is not sufficient and a SIGNAL-TO-NOISE during multi-sampling is deteriorated.

FIG. 5B illustrates operation of the image sensor ISEN under a low-illuminance condition. Upon receiving a low-illuminance condition information signal LLI from the light condition detector LCD, the sampling controller SC may control modification to the second sampling frequency by providing the sampling module SM with a first control signal CS1. The sampling module SM may change the sampling frequency to the second sampling frequency. FIG. 5B illustrates that the sampling frequency of four times is changed to one time. As a result, a second sub-frame time sub frame time_2 is longer than a first sub-frame time sub frame time_1, thereby increasing the maximum pixel exposure time. By increasing the pixel exposure time using the exposure time controller ETC, deterioration of the SIGNAL-TO-NOISE under low-illuminance conditions may be prevented. Alternately, a timing generator may be used to receive the first control signal CS1 to reset a sampling frequency, thereby modifying the sampling frequency of the sampling module SM. In certain configurations the timing generator TG may be included in the sampling module SM.

Figure 6A:
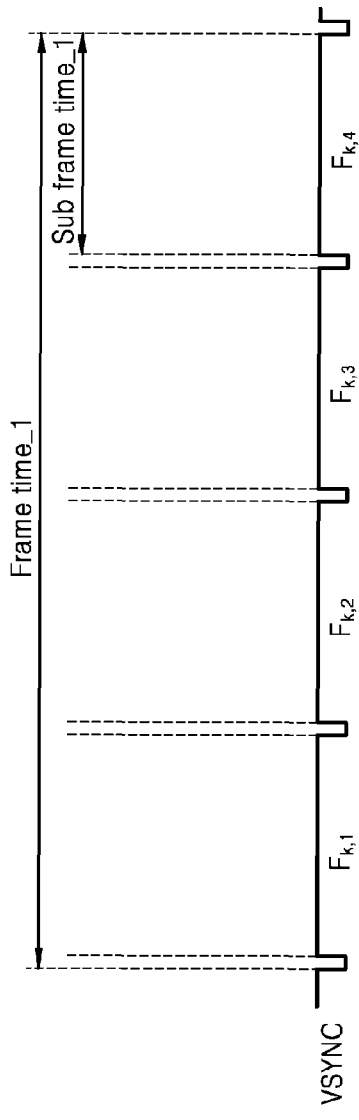
FIGS. 6A and 6B illustrate signal waveforms for a sampling operation when an exposure time controller controls the frame per second (FPS) sampling rate of a sampling module.
Figure 6B:
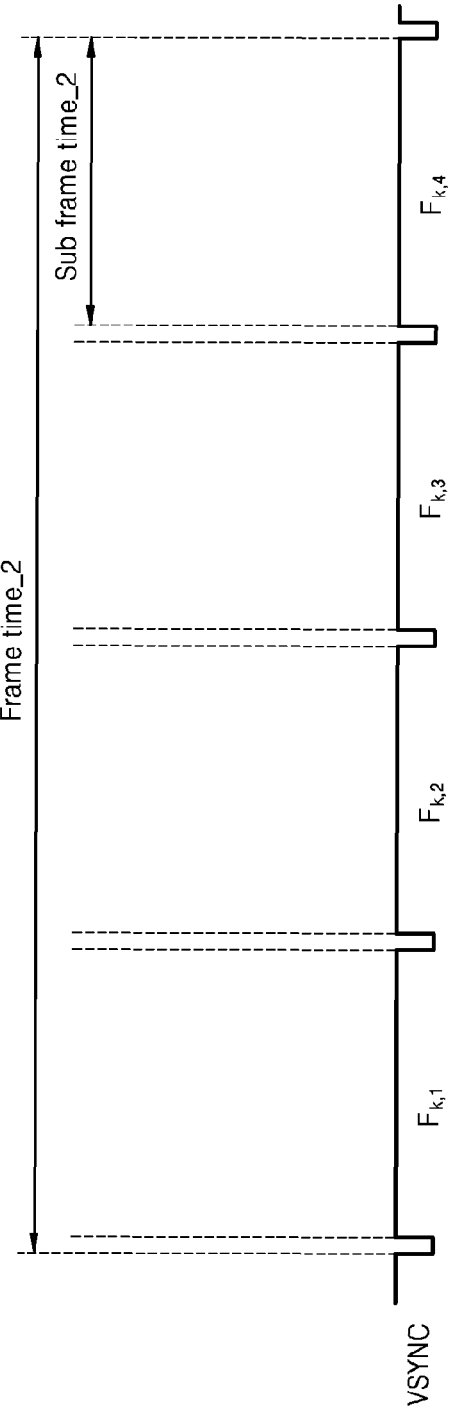

FIGS. 6A and 6B are waveforms illustrating a sampling operation when the exposure time controller ETC controls a sampling rate of the sampling module SM.

The operation illustrated in FIG. 6A is the same as the operation of the image sensor ISEN described with reference to FIG. 5A, and thus, description thereof will be omitted. However, a large first frame time frame time_1 cannot be set in the operation of FIG. 6A using the method described with reference to FIG. 5A. That is, there is a limitation to extension of a pixel exposure time. Accordingly, in order to improve the limitation, a method of setting a large frame time like the second frame time frame time_2 is illustrated in FIG. 6B. According to an embodiment, when a low-illuminance condition information signal LLI is received from the sampling controller SC, a second control signal SC2 may be provided to the sampling module SM, thereby controlling modification of the first sampling rate to the second FPS. According to an embodiment, a frame time may be represented as 1/FPS, and the sampling rate may be reduced so that the second frame time frame time_2 is greater than the first frame time frame time_1 of FIG. 6A. As a result, as the second frame time frame time_2 is greater than before as illustrated in FIG. 6B, the second sub-frame time sub frame time_2 of FIG. 6B may be greater than the first sub-frame time sub frame time_1, and as a result, a pixel maximum exposure time may be increased by using the exposure time controller ETC. Accordingly, deterioration of a signal-to-noise under low-illuminance conditions may be prevented. According to another embodiment, the second control signal CS2 sets a new sampling rate upon receiving the second control signal CS2, thereby modifying the sampling rate of the sampling module SM. Furthermore, the timing generator TG may be included in the sampling module SM.

Figure 7A:
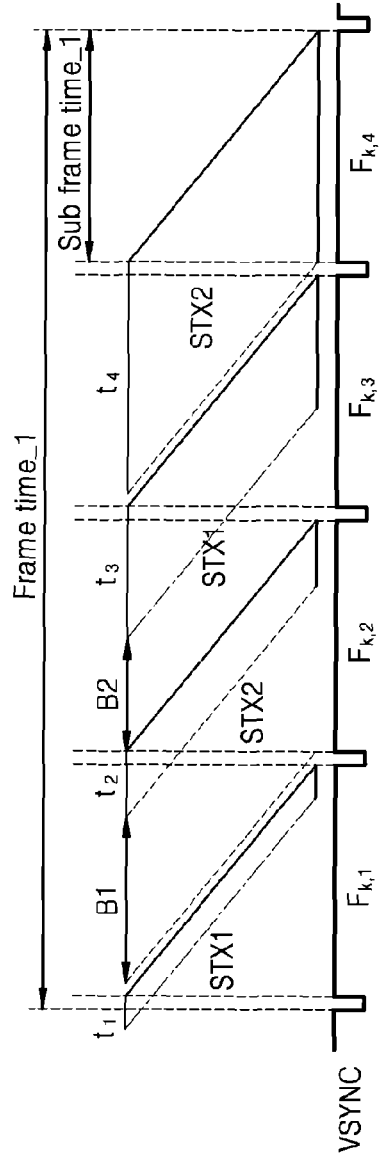
FIGS. 7A and 7B illustrate signal waveforms for a sampling operation when the exposure time controller controls the reset timing of a shuttering unit.
Figure 7B:
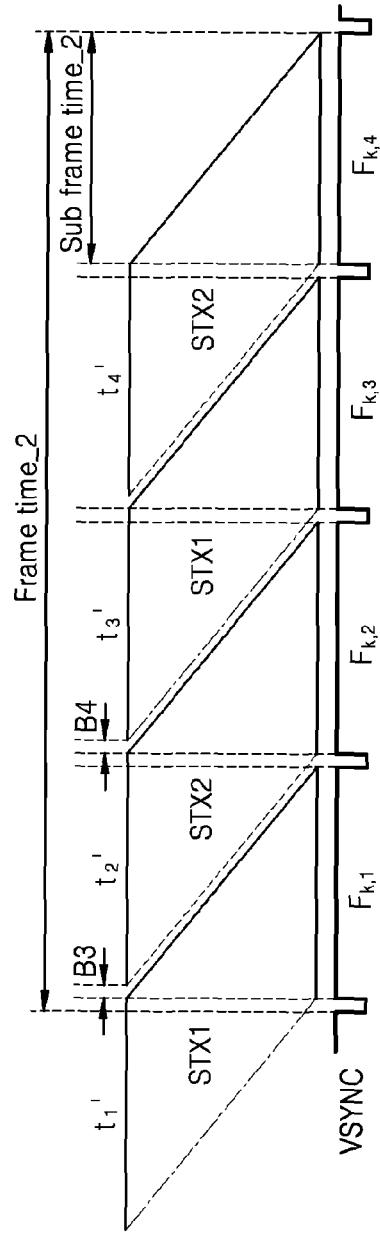

FIGS. 7A and 7B illustrate a sampling operation when the exposure time controller ETC controls a reset timing of a shuttering unit SHUT.

FIG. 7A illustrates an operation of the image sensor ISEN under a high-illuminance condition. In regard to FIG. 7A, the shuttering unit SHUT may be formed of a first resetting unit STX1 and a second resetting unit STX2, and may alternately perform resetting in units of rows of the pixel array PA. By varying pixel exposure times t1, t2, t3, and t4, a dynamic range of a pixel may be extended, and an image quality under a high-illuminance condition may be improved. However, according to the method of FIG. 7A, a pixel exposure time is short as t1, t2, and t3, and thus signal-to-noise deterioration under low-illuminance conditions may be avoided.

Referring to FIG. 7B, an operation of the image sensor ISEN under a low-illuminance condition is illustrated. According to an embodiment, upon receiving low-illuminance condition information signal LLI from the sampling controller SC, a third control signal CS3 is provided to the shuttering unit SHUT, thereby controlling modification of the first pixel exposure time to the second pixel exposure time. Accordingly, the shuttering unit SHUT may modify the pixel exposure time by modifying a reset timing via the third control signal CS3. According to an embodiment, by reducing a first reset timing B3 and a second reset timing B4 of FIG. 7B to be shorter than the first reset timing B1 and the second reset timing B2 of FIG. 7A, pixel exposure times t'1, t'2, and t'3 under a low-illuminance condition may be increased to be longer than the pixel exposure times t1, t2, and t3 of FIG. 7A. As a result, deterioration of a SNR under a low-illuminance condition may be prevented. According to another embodiment, the timing generator TG may receive a third control signal CS3 to reset a pixel exposure time, thereby modifying a reset timing of the shuttering unit SHUT to modify a pixel exposure time. Furthermore, the timing generator TG may be included in the shuttering unit SHUT.

Figure 8:
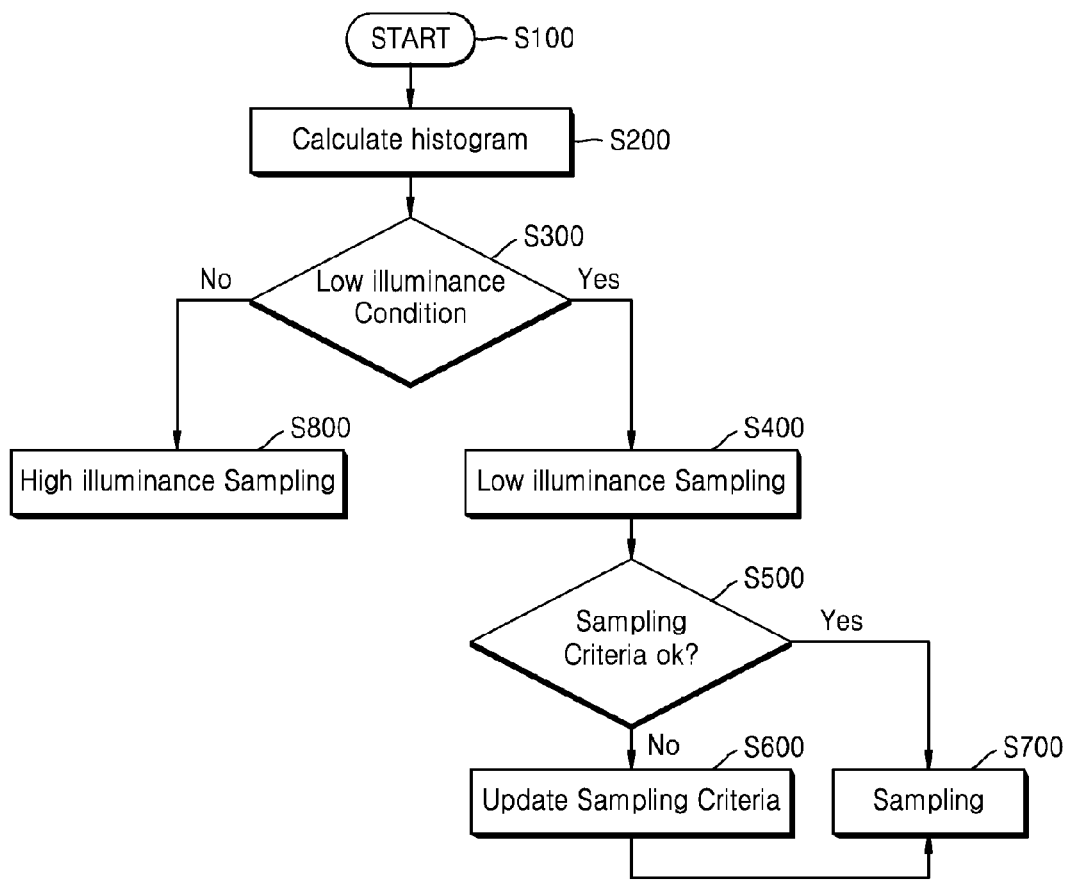
FIG. 8 is a flowchart summarizing one method of operating an image sensor according to an embodiments of the inventive concept.

FIG. 8 is a flowchart summarizing a method of operating the image sensor ISEN of FIGS. 1 and 2.

Referring to FIGS. 1, 2 and 8, when light, such as visible light VLIG, incident to an object strikes a lens (LENS) of the image sensor, operation of the image sensor starts (S100). An illuminance condition is detected using (e.g.,) a histogram analysis method (S200). That is, a illuminance condition may be detected with respect to illuminance information extracted from a pixel signal. Then, a determination is made as to whether or not the detected illuminance condition are consistent with low-illuminance conditions (S300) based on illuminance information LI. This determination may include calculating a range of bit values for the illuminance information LI based on the illuminance information LI converted to the digital data and generating a high-illuminance condition information signal HLI and a low-illuminance condition information signal LLI. Under low-illuminance conditions, low illuminance sampling is performed (S400), wherein at least one of a sampling frequency, sampling rate, and pixel exposure time are set appropriately in view of the low-illuminance conditions. That is, the existing (or currently used) sampling frequency, sampling rate, and/or pixel exposure time (singularly or collectively "sampling criteria") is tested for appropriateness (S500). Should the existing sampling criteria prove appropriate in view of the illuminance conditions, then sampling is performed (S700), else the sampling criteria may be appropriately updated (S600). For example, the method may determine whether there is data related to a second sampling frequency, second sampling rate, and second pixel exposure time that are appropriate for low-illuminance conditions by referring to the sampling data register SDR. If such data is present, the second sampling frequency, second sampling rate, and second pixel exposure time may be set using the data. In contrast, if the data is not present, the updating operation (S600) may be used to derive and set the second sampling frequency, second sampling rate, and second pixel exposure time to be appropriate for the low-illuminance condition.

When high-illuminance conditions are detected, high-illuminance sampling is performed (S800). Here, the method may include modifying the second sampling frequency, the second FPS, and the second pixel exposure time which have been set under the low-illuminance condition to a first sampling frequency, a first FPS, and a first pixel exposure time that are preset based on the high-illuminance condition. Furthermore, the sampling data register SDR may be referred to and use the first sampling frequency, the first FPS, and the first pixel exposure time that are stored in the sampling data register SDR.

Figure 9:
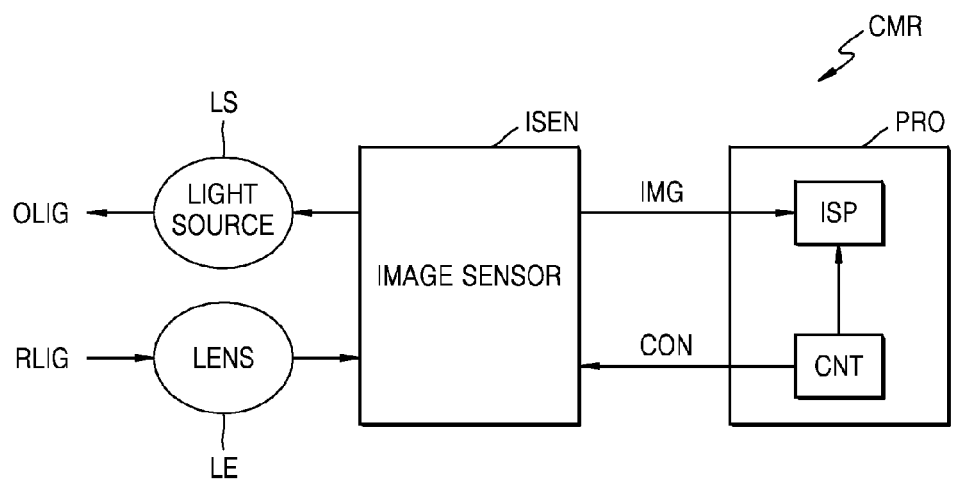
FIG. 9 is a block diagram illustrating an image photographing apparatus according to an embodiment of the inventive concept.

FIG. 9 is a block diagram illustrating an image photographing apparatus CMR according to an embodiment of the inventive concept.

Referring to FIGS. 1 and 9, the image photographing apparatus CMR may include the image sensor ISEN of FIG. 1 that receives reflection light RLIG which is output light OLIG output from a light source LS as reflected from an object OBG and sensed as image information IMG about the object. The light source LS may emit both a visible ray and an infrared ray. The image photographing apparatus CMR according to the current embodiment of the inventive concept may further include a processor PRO including a controller CNT that controls the image sensor ISEN through a control signal XCON and a signal processing circuit ISP that performs signal processing with respect to the image information IMG sensed by using the image sensor ISEN.

Figure 10:
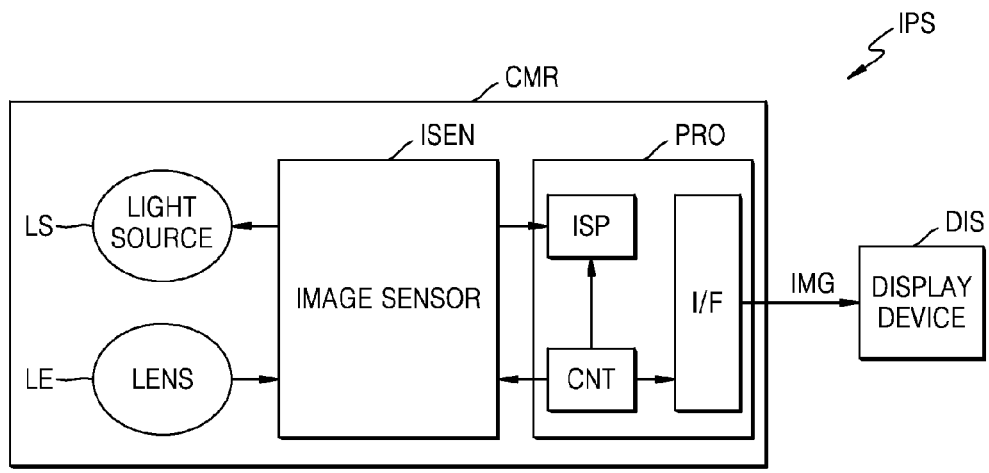
FIG. 10 is a block diagram illustrating an image processing and visualization system according to an embodiment of the inventive concept.

FIG. 10 is a block diagram illustrating an image processing and visualization system IPS according to an embodiment of the inventive concept.

Referring to FIG. 10, the image processing and visualization system IPS may include an image photographing apparatus CMR and a display device that displays an image received from the image photographing CMR. To this end, the processor PRO of FIG. 9 may further include an interface IF through which image information IMG received from the image sensor ISEN is transmitted to a display device DIS.

Figure 11:
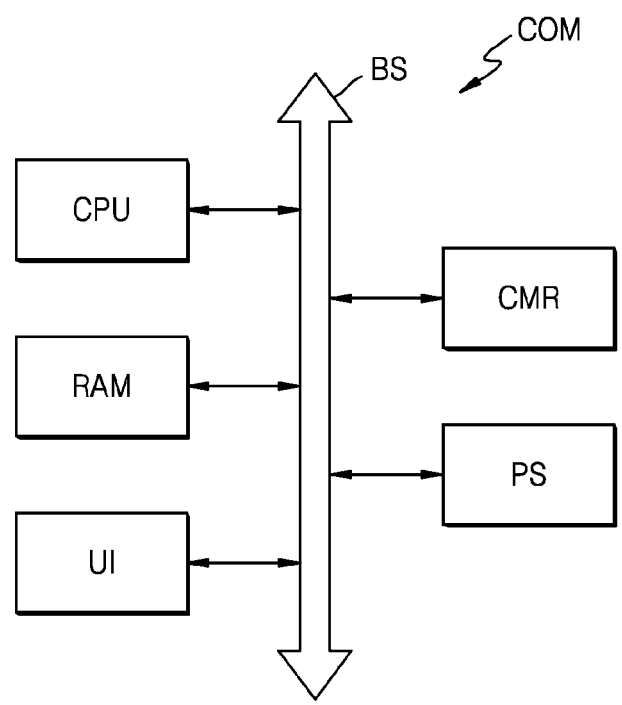
FIG. 11 is a block diagram illustrating a computing system device according to an embodiment of the inventive concept.

FIG. 11 is a block diagram illustrating a computing system device COM according to an embodiment of the inventive concept.

Referring to FIG. 11, the computing system device COM includes a central processing unit CPU that is electrically connected to a bus BS, a user interface UI, and an image photographing apparatus CMR. The image photographing apparatus CMR may include the image sensor ISEN and the processor PRO according to the embodiment of the inventive concept as described above.

The computing system device COM according to the current embodiment of the inventive concept may further include a power supply device PS. Also, the computing system device COM may further include a storage device RAM that stores image information IMG transmitted from the image photographing device CMR.

If the computing system device COM according to the current embodiment of the inventive concept is a mobile device, a battery for supplying an operating voltage to the computing system and a modem such as a baseband chipset may be additionally provided. Also, the computing system device COM may be further provided with an application chipset, a mobile dynamic random access memory (DRAM), or the like, and as this is obvious to one of ordinary skill in the art, detailed description thereof will be omitted.

While the inventive concept has been particularly shown and described with reference to embodiments thereof, the embodiments should be considered in descriptive sense only and not for purposes of limitation. For example, it will be understood by those skilled in the art that various changes in form and details of the method of calculating a phase delay regarding consecutive images described above may be made. Therefore, the scope of the inventive concept is defined not by only the detailed description of the inventive concept but by the appended claims.

What is claimed is:

1. An image sensor initially operating in a base mode according to a first sampling frequency and a first pixel exposure time, the image sensor comprising:
 a light condition detector that extracts illuminance information from a pixel signal received from pixels in a pixel array, and generates a low-illuminance information signal upon detecting that a value of the illuminance information is within a first range;
a sampling controller that changes the first sampling frequency to a second sampling frequency for varying a maximum range of a pixel exposure time in response to the low-illuminance information signal; and
an exposure time controller that changes the first pixel exposure time to a second pixel exposure time based on the maximum range of the pixel exposure time in response to the low-illuminance information signal.

2. The image sensor of claim 1, wherein:
after generating the low-illuminance information signal, the light condition detector generates a high-illuminance information signal upon detecting that the value of the illuminance information is within a second range different from the first range,
the sampling controller changes the second sampling frequency to the first sampling frequency in response to the high-illuminance information signal, and
the exposure time controller changes the second exposure time to the first pixel exposure time in response to the high-illuminance information signal.

3. The image sensor of claim 1, wherein the image sensor further comprises a shutter that operates using a rolling shutter method in response to a control signal provided by the exposure time controller during a reset operation applied to the pixels.

4. The image sensor of claim 1, wherein the image sensor further comprises a sampling circuit that samples the pixel signal in response to a control signal generated by the sampling controller in response to at least one of the first sampling frequency and the second sampling frequency.

5. The image sensor of claim 1, wherein the first sampling frequency is defined as a first frames per second (FPS) rate, and the second sampling frequency is defined as a second FPS rate.

6. The image sensor of claim 1, wherein the image sensor further comprises a shutter that resets the pixels in response to at least one of the first pixel exposure time and the second pixel exposure time.

7. The image sensor of claim 6, wherein the exposure time controller controls the shutter such that the shutter adjusts a reset timing in response to the change from the first pixel exposure time to the second pixel exposure time.

8. The image sensor of claim 1, wherein the second pixel exposure time is longer than the first pixel exposure time.

9. The image sensor of claim 1, wherein:
the image sensor further comprises a register,
data defining the first sampling frequency and the second sampling frequency is stored in the register as first data, and
data defining the first pixel exposure time and the second pixel exposure time is stored as second data in the register.

10. The image sensor of claim 9, wherein the sampling controller references the first data stored in the register when changing the first sampling frequency to the second sampling frequency and the first and second data are stored in the register before the sampling controller changes the first sampling frequency to the second sampling frequency.

11. An image photographing apparatus comprising:
a lens that receives light incident to an object;
an image sensor that senses image information from the incident light communicated via the lens;
a processor that controls the image sensor and performs signal-processing on the image information communicated via the image sensor, wherein:
the image sensor initially operates in a base mode according to a first sampling frequency and a first pixel exposure time, and the image sensor comprises:
a light condition detector that extracts illuminance information from a pixel signal received from pixels in a pixel array, and generates a low-illuminance information signal upon detecting that a value of the illuminance information is within a first range;
a sampling controller that changes the first sampling frequency to a second sampling frequency for varying a maximum range of a pixel exposure time in response to the low-illuminance information signal; and
an exposure time controller that changes the first pixel exposure time to a second pixel exposure time based on the maximum range of the pixel exposure time in response to the low-illuminance information signal.

12. The image photographing apparatus of claim 11, wherein:
after generating the low-illuminance information signal, the light condition detector generates a high-illuminance information signal upon detecting that the value of the illuminance information is within a second range different from the first range,
the sampling controller changes the second sampling frequency to the first sampling frequency in response to the high-illuminance information signal, and
the exposure time controller changes the second exposure time to the first pixel exposure time in response to the high-illuminance information signal.

13. The image photographing apparatus of claim 11, wherein the image sensor further comprises a shutter that operates using a rolling shutter method in response to a control signal provided by the exposure time controller during a reset operation applied to the pixels.

14. The image photographing apparatus of claim 11, wherein the image sensor further comprises a sampling circuit that samples the pixel signal in response to a control signal generated by the sampling controller in response to at least one of the first sampling frequency and the second sampling frequency.

15. The image photographing apparatus of claim 14, wherein the first sampling frequency is defined as a first frames per second (FPS) rate and the second rate sampling frequency is defined as a second FPS rate different from the first FPS rate.

16. A method of operating an image sensor, the method comprising:
determining whether the image sensor is operating in low-illuminance conditions, and upon determining that the image sensor is operating in low-illuminance conditions, defining: (1) a first sampling frequency, as a first frames per second (FPS) rate, for varying a maximum range of a pixel exposure time and (2) a first pixel exposure time for the image sensor, else
upon determining that the image sensor is not operating in low-illuminance conditions, defining a second sampling frequency as a second FPS rate different from the first FPS rate and a second pixel exposure time different from the first pixel exposure time for the image sensor.

17. The method of claim 16, wherein the determining of whether the image sensor is operating in low-illuminance conditions comprises calculating a histogram for a pixel signal received by the image sensor.

18. The method of claim 16, further comprising determining whether or not the first FPS rate and the first pixel exposure time are appropriate for the low-illuminance conditions, and upon determining that at least one of the first FPS rate and the first pixel exposure time is not appropriate for the low-illuminance conditions, updating the at least one of the first FPS rate and the first pixel exposure time.

19. The method of claim 16, wherein a light condition detector extracts illuminance information from a pixel signal received from pixels of a pixel array, and generates a low-illuminance information signal upon detecting that a value of the illuminance information is within a first range.

20. The method of claim 19, further comprising:
using a sampling controller to change the first FPS rate to the second FPS rate in response to the low-illuminance information signal; and
using an exposure time controller to change the first pixel exposure time to the second pixel exposure time in response to the low-illuminance information signal.

* * * * *